United States Patent [19]

Bush et al.

[11] Patent Number: 4,963,052

[45] Date of Patent: Oct. 16, 1990

[54] MECHANICAL END JOINT SYSTEM FOR CONNECTING STRUCTURAL COLUMN ELEMENTS

[75] Inventors: Harold G. Bush, Yorktown; Martin M. Mikulas, Jr., Poquoson; Richard E. Wallsom, Williamsburg, all of Va.

[73] Assignee: The United States of America as represented by the Administrator of the National Aeronautics and Space Administration, Washington, D.C.

[21] Appl. No.: 501,910

[22] Filed: Mar. 30, 1990

Related U.S. Application Data

[63] Continuation-in-part of Ser. No. 388,264, Aug. 1, 1989, abandoned, which is a continuation-in-part of Ser. No. 223,122, Jul. 22, 1988, abandoned.

[51] Int. Cl.⁵ .................. B25G 3/18; F16B 21/00
[52] U.S. Cl. ..................................... 403/322; 403/327; 403/331; 403/171
[58] Field of Search ................ 403/322, 325, 339, 340, 403/331, 171, 317, 327

[56] References Cited

U.S. PATENT DOCUMENTS 4,340,318  7/1982  Frosch ................................. 403/217
4,557,133  12/1985  Mikusch .......................... 403/340 X

*Primary Examiner*—Andrew V. Kundrat
*Attorney, Agent, or Firm*—George F. Helfrich; John R. Manning

[57] ABSTRACT

A mechanical end joint system for connecting structural column elements and eliminating the possibility of free movement between joint halves during loading or vibration has a node joint body having a cylindrical engaging end, and a column end body having a cylindrical engaging end. Each of the cylindrical engaging ends has an integral semicircular tongue and an integral semicircular groove. The node joint body has a conical aperture at the center of its cylindrical engaging end. The column end joint body has an internal latch mechanism housed therein, with the internal latch mechanism having a latch bolt element slidably disposed along the longitudinal axis of the column end joint body at the cylindrical engaging end. The internal latch mechanism also has a spring mechanism disposed along the longitudinal axis of the column end joint body, as well as a compressible preload mechanism and plunger means housed therein. Locking of the mechanical end joint system and adding a preload across the semiconductor tongue and semicircular groove faces is accomplished by compressing the preload mechanism, thereby exerting and equal and opposite force on the latch bolt element and plunger means, and causing the node joint body and the column end joint body to be pressed tightly against each other, effecting a preloaded compressive fit between the two joint halves. As well, a secondary locking means prevents inadvertent disassembly.

6 Claims, 8 Drawing Sheets

MECHANICAL END JOINT SYSTEM FOR CONNECTING STRUCTURAL COLUMN ELEMENTS

ORIGIN OF THE INVENTION

The invention described herein was made in the performance of work under a NASA contract and is subject to the provisions of Section 305 of the National Aeronautics and Space Act of 1958, Public Law (72 Stat. 435; 42 USC 2457).

CROSS-REFERENCE

This application is a continuation-in-part of our application Ser. No. 07/388,264, filed Aug. 1, 1989, now abandoned which is a continuation-in-part of our application Ser. No. 07/223,122, filed Jul. 22, 1988, now abandoned.

BACKGROUND OF THE INVENTION

1. Field of the Invention

This invention relates to mechanical end joint systems, and more particularly, to a mechanical end joint system useful for the transverse connection of numerous strut elements to a common node to permit the rapid assembly and disassembly of diverse skeletal framework structures.

2. Description of the Related Art

The development of skeletal framework structures with increased structural integrity and efficiency is essential to the success of many projects involving the exploration of space. Due to limitations in orbital payload capacity and in the mobility of the astronauts who will be constructing such structures, simplicity and ease of assembly are major goals. Furthermore, the weightlessness of space demands the development of very rigid structures with no free movement between the members thereof.

One area of weakness in prior space structures has been the failure to produce a structurally sound joint system which eliminates the possibility of free movement between the joint halves during loading or vibration. Previous methods of making terrestrial joint connections in a framework structure using mechanical fasteners, welding operations, or threaded fittings are unsuited to space applications. For example, suited astronauts, who have a limited amount of time in which to work require a joint which requires little energy to assemble, since they will be required to assemble many joints in a work shift.

Also, because of the enormous cost of keeping astronauts in space relative to the costs associated with construction on earth, a joint system is demanded which requires minimum time to assemble. Thus, a need continues to exists for a joint system for column elements in a framework structure that is easily and quickly engaged, with a minimum of force or manipulations, and which eliminates the possibility of free movement between the joint halves which may be engaged between two fixed nodes.

SUMMARY OF THE INVENTION

Accordingly, it is an object of the present invention to provide a joint system that eliminates the possibility of free movement between the joint halves.

A further object of the present invention is to provide a joint system which can be easily and quickly engaged and disengaged with a minimum of force or manipulation.

Other objects and advantages of this invention will become apparent hereinafter in the specifications and drawings which follow.

According to the present invention, the foregoing and additional objects are attained by providing a node joint body with an integral semicircular tongue and groove and a column end joint body with an integral semicircular tongue and groove. The two joint halves are engaged transversely, the tongue of the node joint body mating with the groove of the column end joint body, and the groove of the node joint body mating with the tongue of the column end joint body.

The joint system employs a spring loaded internal sliding latch mechanism housed in the column end joint body. During mating, this sliding latch mechanism is pushed away from the node joint body and enters the node joint body when mating is completed. In order to lock the joint and add a preload across the tongue and groove faces, an operating ring collar is rotated through 45 degrees causing an internal mechanism to compress a Belleville washer preload mechanism. This causes an equal and opposite force to be exerted on the latch bolt and the latch plunger. This force causes the two joint halves to be pressed tightly together, effecting a preloaded compressive fit and eliminating the possibility of free movement between the joint halves during loading or vibration.

In order to prevent inadvertent disassembly, a secondary lock is also engaged when the joint is closed. Plungers are carried in the operating ring collar. When the joint is closed, the plungers fall into tracks on the column end joint body, which allow the joint to be opened only when the operating ring collar and plungers are pushed directly away from the joining end.

DESCRIPTION OF THE PREFERRED EMBODIMENT

Figure 10:
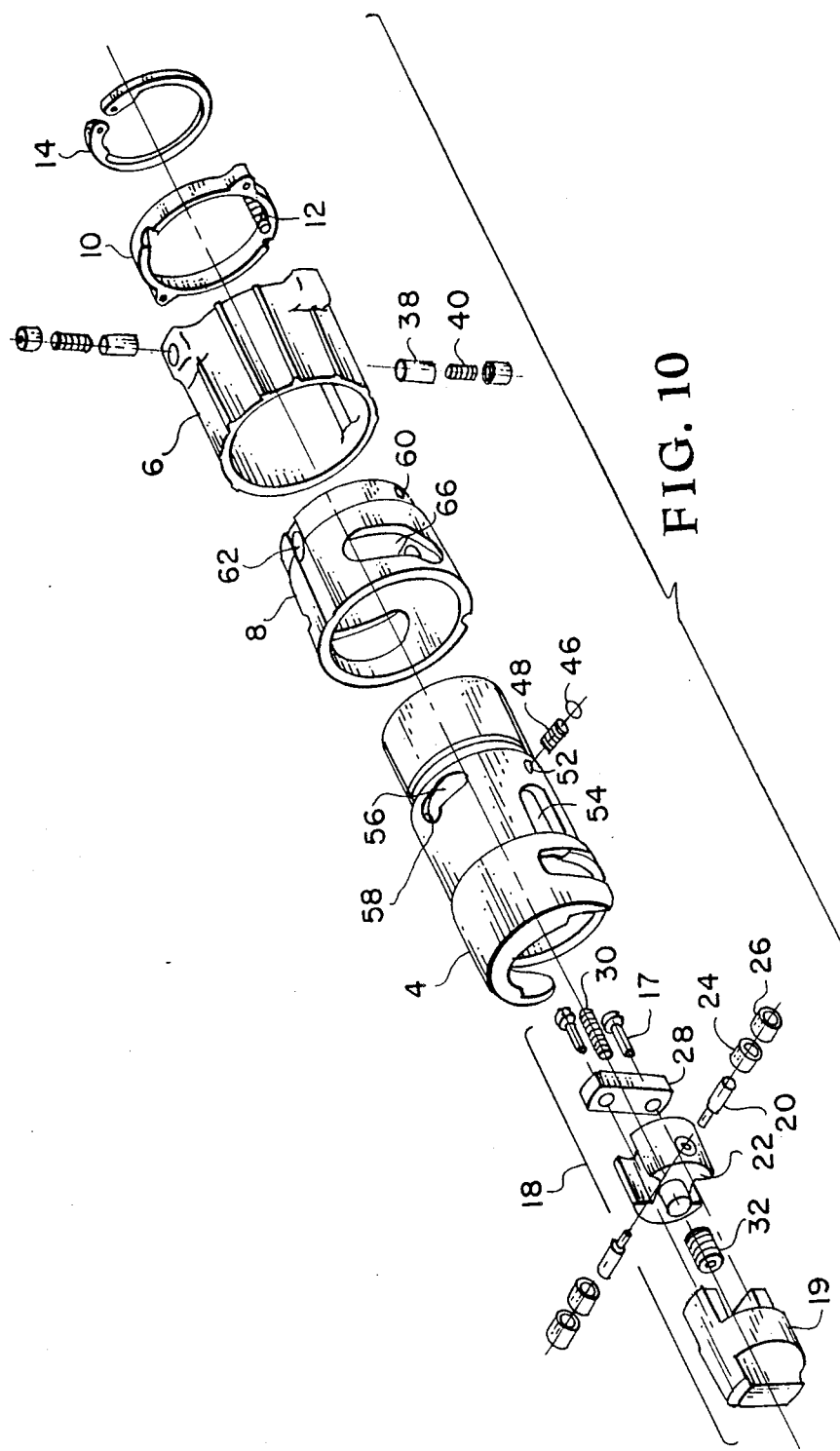
FIG. 10 is an exploded view of the column end joint body as in FIG. 2 according to the present invention.

Referring now to the drawings, and more particularly to FIG. 10, an exploded view of the column end joint body 4 is shown. This figure clearly demonstrates how the operating ring collar 6 and the latch operating ring 8 slide over the column end joint body 4. It also shows the placement of plungers 38 and plunger springs 40, the reaction ring 10, reaction ring springs 12, and the retaining ring 14. As well, this figure shows exactly how latch pins 20 and latch retainer screws 17 are separated.

Figure 1:
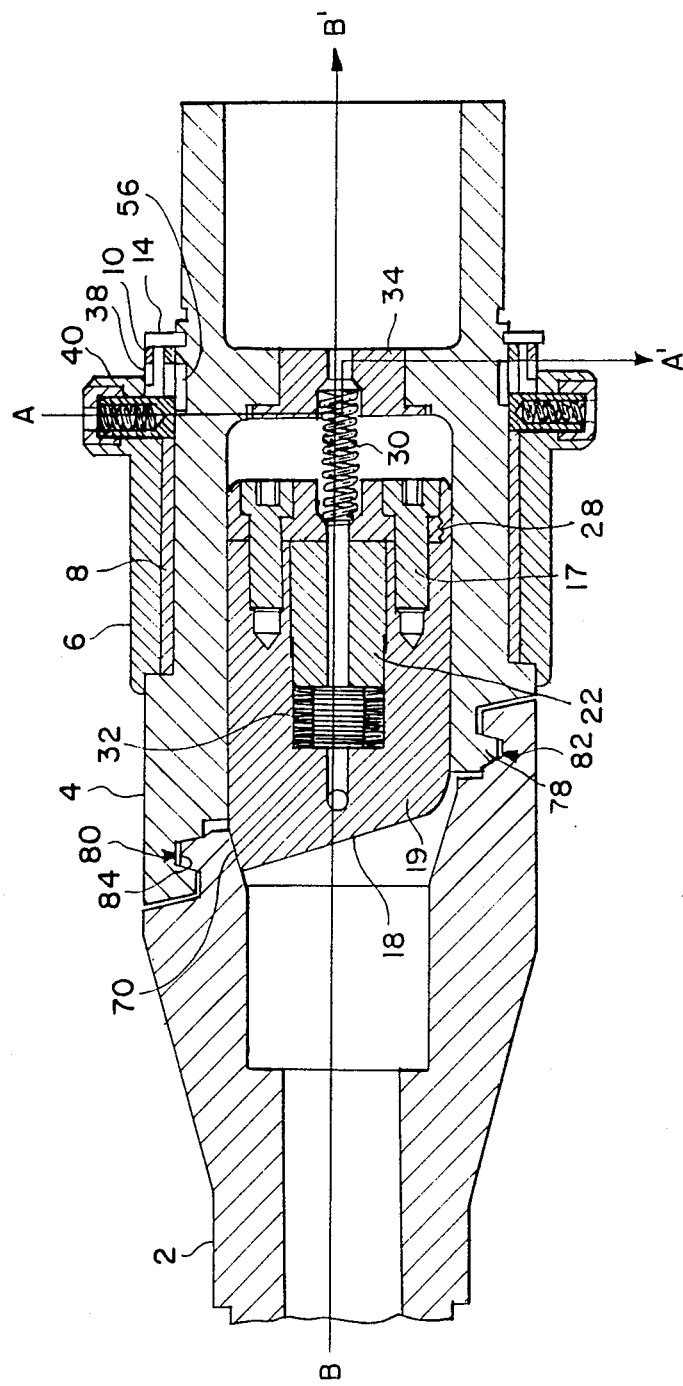
FIG. 1 is a cross-sectional view of the mated node and column end joint bodies according to the present invention.

Referring now to FIG. 1, there is shown the joined node joint body 2 and column end joint body 4. In the illustrated embodiment, an internal latch mechanism 18 is housed within the column end joint body 4. The internal latch mechanism 18 comprises the latch bolt 19, preload Belleville washer stack 32, latch plunger 22, latch retainer 28, and is held together with latch retainer screws 17. This internal latch mechanism 18 is slidably disposed within column end joint body 4. Latch spring 30 is located between latch retainer 28 and latch plug 34 allowing the internal latch mechanism 18 to deflect when a longitudinal force is applied against inclined sliding latch bolt 19.

Figure 2:
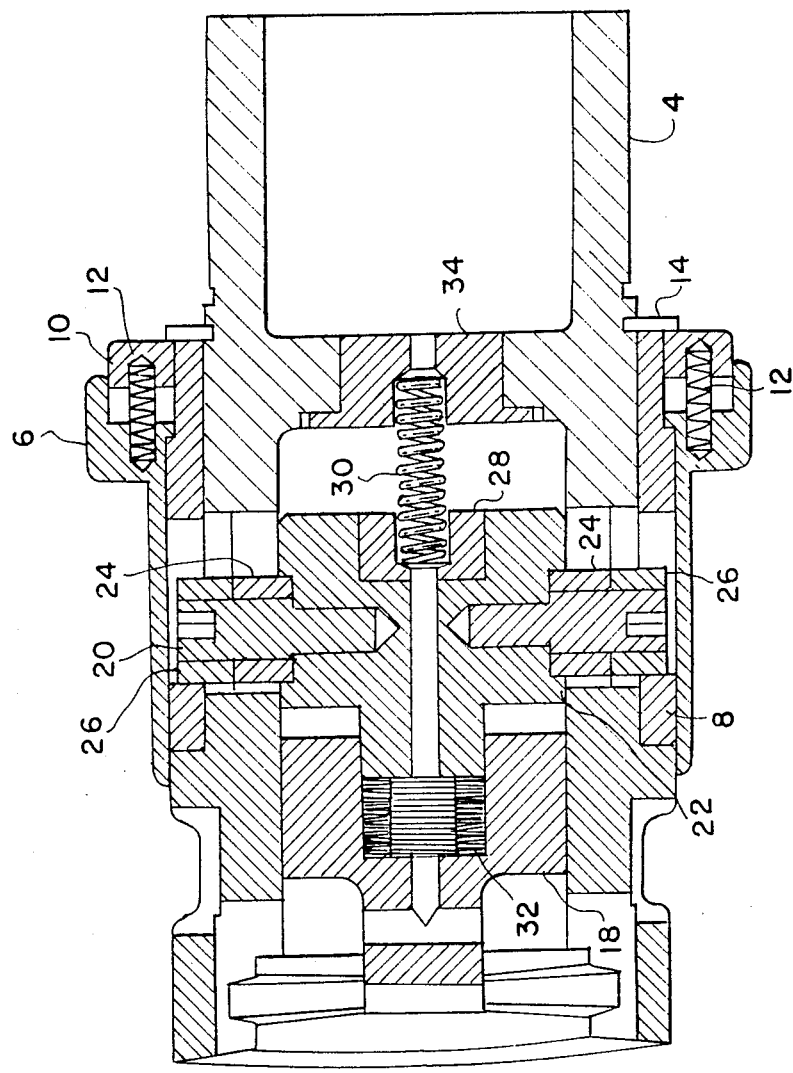
FIG. 2 is a cross-section along line B—B' of FIG. 1 showing only the column end joint body according to the present invention.

Referring now to FIG. 2 a vertical cross-sectional view of column end joint body 4 along line B—B' of FIG. 1 is shown. Latch pins 20 screw into latch body 22 and serve as an internal brace for needle roller bearings 24 and 26. Reaction ring 10 holds reaction ring spring 12 in the operating ring collar 6. The reaction ring spring 12 causes the operating ring collar 6 to spring back into its optimum position as close to the joint as possible if the operating ring collar 6 is pulled back for any reason.

Figure 3:
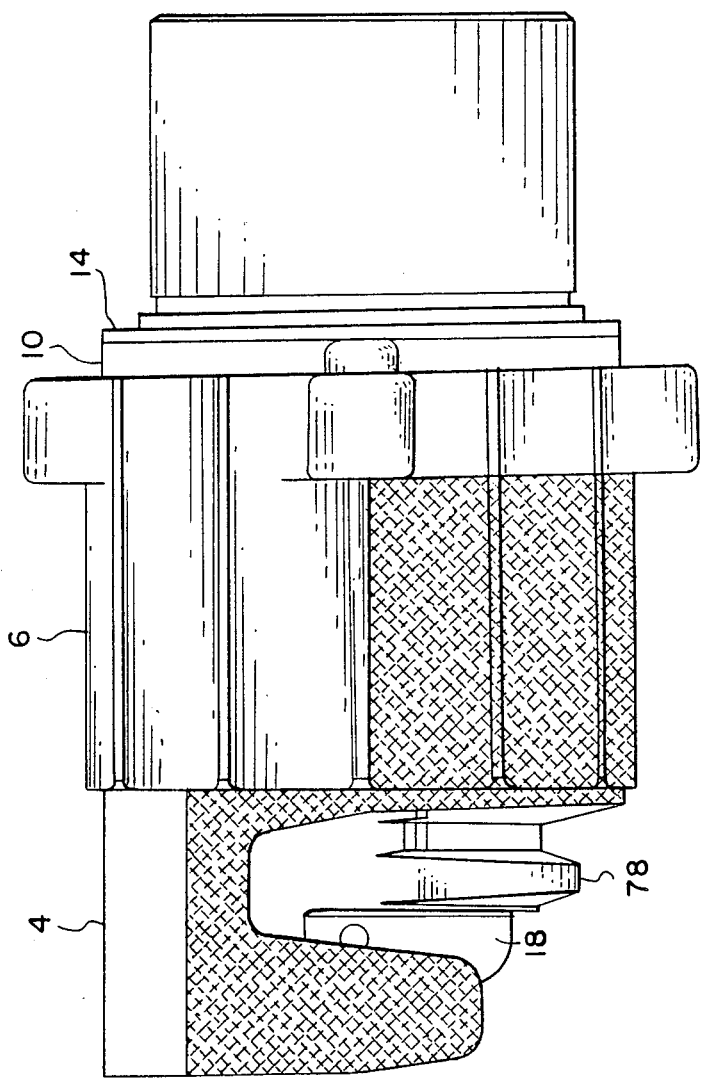
FIG. 3 is a pictorial view of the column end joint body of FIG. 3 according to the present invention.

Referring now to FIG. 3, there is shown a side view of the column end joint body 4. Integral semicircular tongue 78 is pictured, which matches integral semicircular groove 80 as shown in FIG. 1. Integral semicircular tongue 84 and groove 82 are also located in the node joint body. The semicircular tongue and groove mating is described more fully in U.S. Pat. No. 4,340,318 to Bush, et al, which is hereby incorporated by reference herein. Also shown in FIG. 3 is the operating ring collar 6 and retaining ring 14, such as a snap ring, which locks the other various collars and rings into place on the column end joint body 4. The color coding on the end joint system is also displayed. When the joint is closed and locked the two colored areas are aligned.

Figure 4:
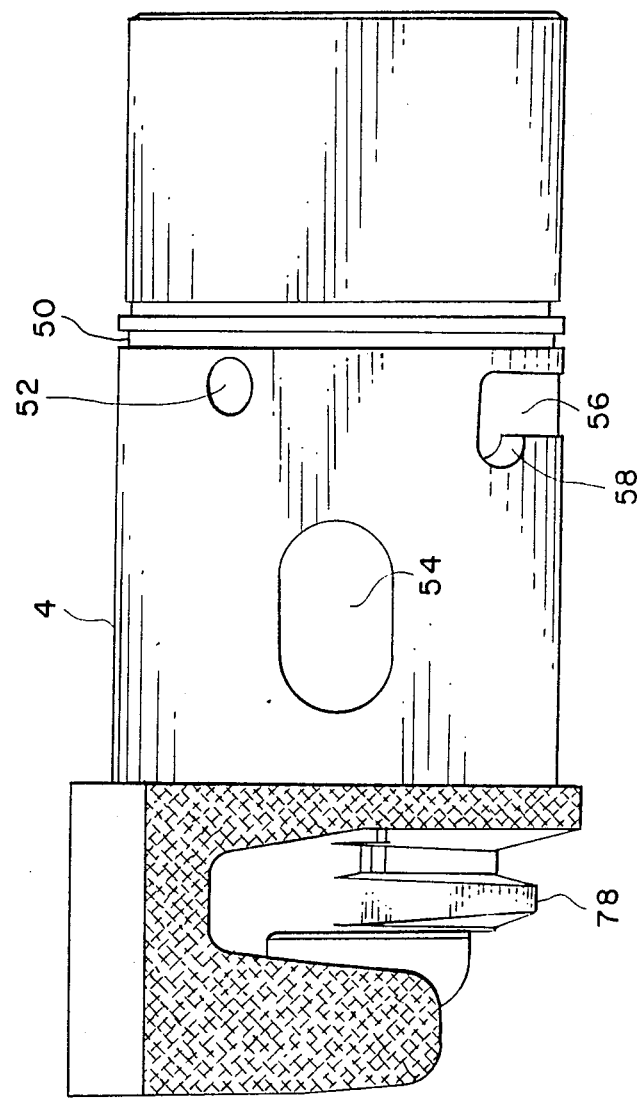
FIG. 4 is a pictorial view of the detail of the column end joint body of FIG. 3 without the operating ring collar or the latch operating ring according to the present invention.

Referring now to FIG. 4, a side view of column end joint body 4 is shown without operating ring collar 6 or the latch operating ring 8. Pictured is the bare surface of column end joint body 4, which contains latch pin window 54. The inner needle roller bearing 24 of FIG. 2 rides in the longitudinal latch pin window 54 when the lock is engaged. Retaining ring groove 50 is the groove that holds retaining ring 14 when the entire column end joint body 4 is assembled.

Figure 6:
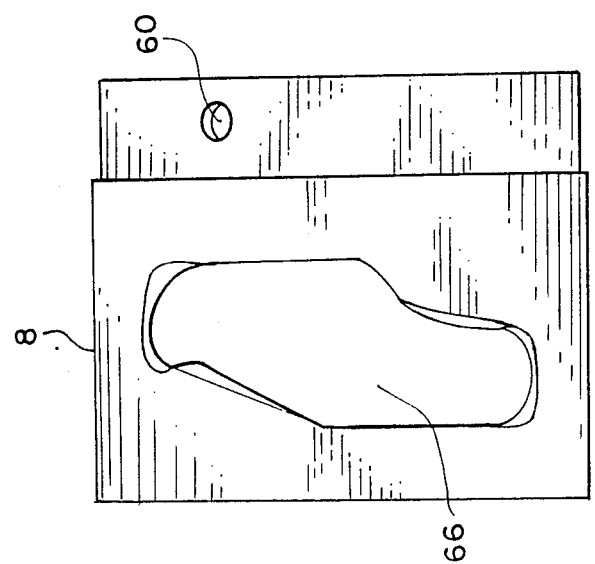
FIG. 6 is a pictorial view of the latch operating ring according to the present invention.
Figure 5:
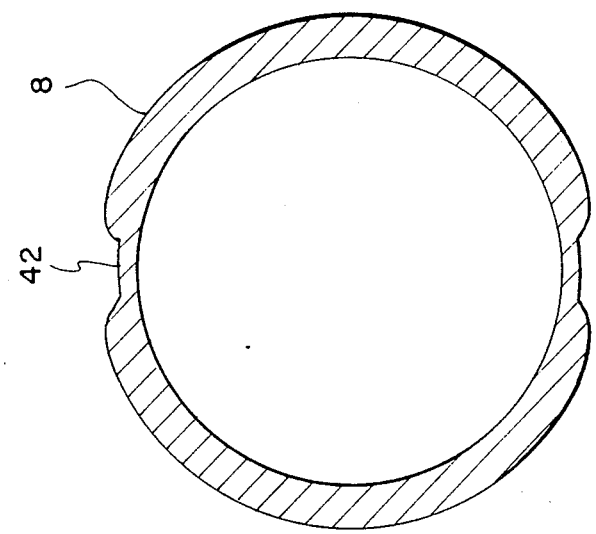
FIG. 5 is a cross-sectional view of the latch operating ring according to the present invention.
Figure 7:
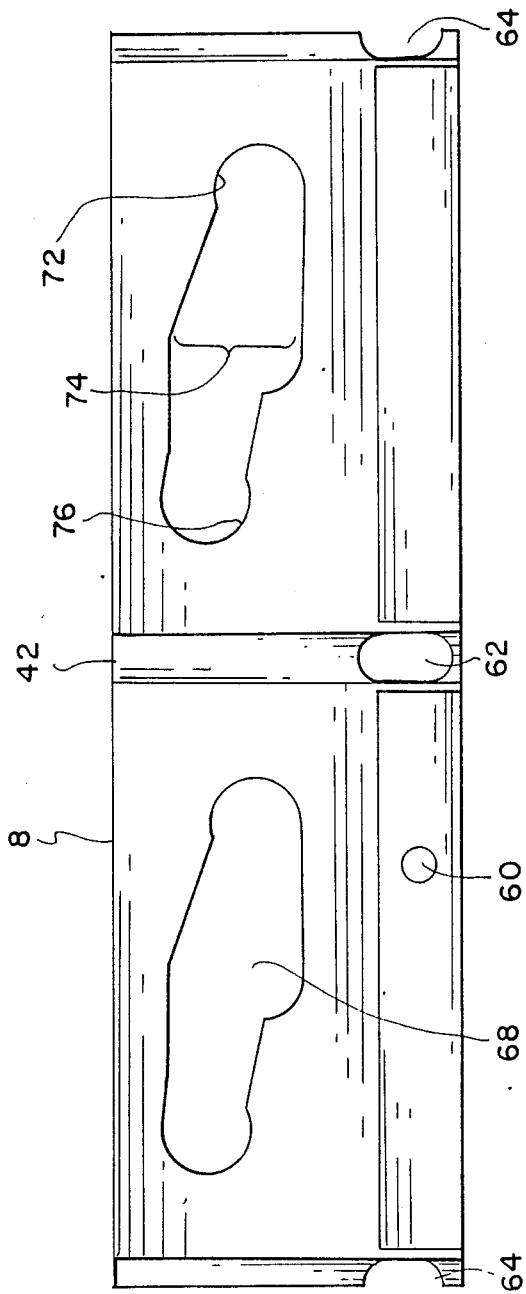
FIG. 7 is a developed view of the latch operating ring of FIG. 6 according to the present invention which has been cut in half and opened up.

Referring now to FIGS. 5,6, and 7, views of the latch operating ring 8 are shown. Latch tracks 66 and 68 which comprise unlatched bearing point 72, assembly position free space 74 and locked bearing point 76, are pictured. The outer needle roller bearing 26 of FIG. 2 is in the unlatched bearing point 72 when the joint bodies are unattached. As the operating ring collar 6 is rotated through 45 degrees the outer needle roller bearing 26 is moved into the locked bearing point 76.

Figure 9:
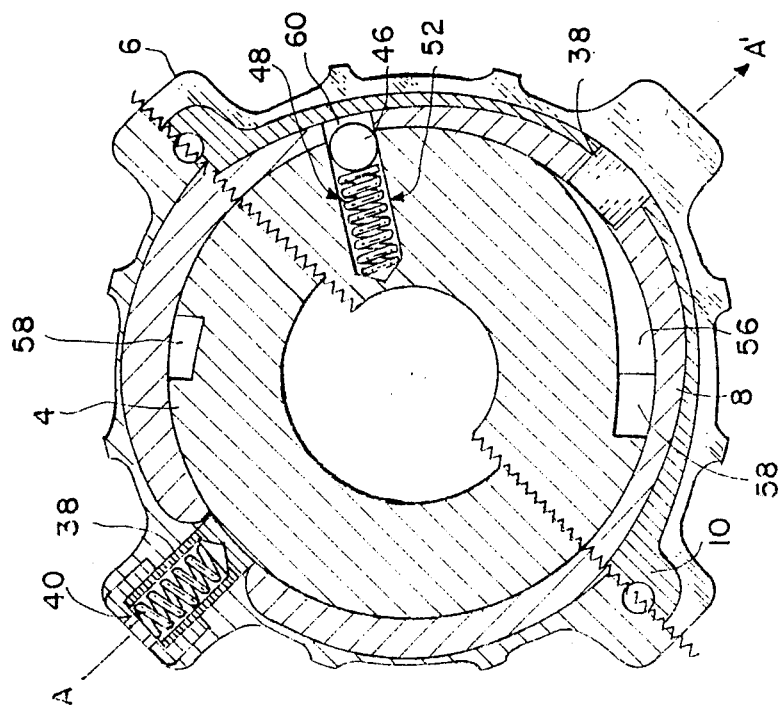
FIG. 9 is a cross-section along line A—A' of FIG. 1 of the column end body according to the present invention.
Figure 8:
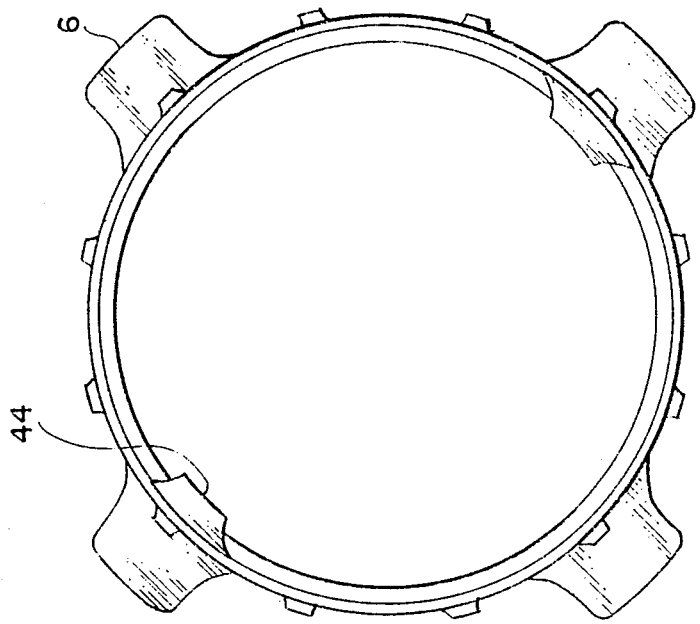
FIG. 8 is a cross-sectional view of the operating ring collar according to the present invention.

Referring now to FIGS. 8 and 9, the operating ring collar 6 is shown. The interior of the operating ring collar 6 contains ridges 44. These collar ridges 44 match up with operating ring grooves 42 on the latch operating ring 8(FIG. 5) to prevent the operating ring collar 8 from slipping when it is slid over the latch operating ring 8, and to cause operating ring collar 6 and latch operating ring 8 to move in unison.

In order to mate the column end joint body 4 with the node joint body 2, the latch operating ring 8 must rotate to an angular position such that the assembly position free space 74 of the latch tracks 66 and 68 (FIG. 7) is over the latch pin window 54 on the column end joint body 4 (FIGS. 4 and 10). The detent ball 46 and detent ball spring 48 (FIGS. 9 and 10) will hold the latch operating ring 8 in position through ball detent hole 60 on the latch operating ring 8 (FIGS. 6 and 10) and ball detent channel 52 on the column end joint body 4 (FIGS. 4 and 10). Assembly of the joint system is accomplished by a transverse force on column end joint body 4 with its semicircular tongue 78 and groove 80 disposed to accept the semicircular groove 82 and tongue 84, respectively, of the node joint body 2 (FIG. 1). The transverse force on column end joint body 4 causes sliding latch bolt 19 (FIGS. 1 and 2) to be pushed away from node joint body 2 until the longitudinal axes of the two joint halves become colinear, at which point sliding latch bolt 19 is pushed against conical mating surface 70 by latch spring 30, and the semicircular tongue 78 and groove 80 of the column end joint body 4 mate with semicircular groove 82 and tongue 84 of the node joint body 2, respectively.

In order to lock the joint and add a preload across the tongue and groove faces, operating ring collar 6 is rotated 45 degrees so that the latch pins 20 (FIG. 2) are moved toward node joint body 2. This latch pin movement causes a similar movement of latch plunger 22, which in turn causes preload Belleville washer stack 32 to compress and exert an equal and opposite force on latch plunger 22 and sliding latch bolt 19. The force imparted to sliding latch bolt 19 causes the column end joint body 4 and node joint body 2 to be pressed more tightly together, effecting a preload compressive fit, thereby eliminating the possibility of free movement between the joint halves during loading or vibration. The force imparted to latch plunger 22 is transferred to the latch operating ring 8 (FIG. 7) by means of outer needle roller bearings 26, which reached assembly position free space 74 from unlatched bearing point 72 when the semicircular tongue and grooves mated. The outer needle roller bearings 26 move from the assembly position free space 74, up the ramp, and over the peak in the latch tracks 66 and 68 until they lock into place in the locked bearing point 76. In order to prevent inadvertent disassembly, a secondary lock (FIG. 9) also engages when the joint is closed. Plungers 38, containing plunger springs 40, are carried at all times in the body of operating ring collar 6 and lock plunger holes 62 and 64 of latch operating ring 8 (FIGS. 7 and 10). When operating ring collar 6 and operating ring 8 are rotated, moving outer needle roller bearings 26 into locked bearing point 76, plungers 38 are pulled across the surface of column end joint body 4 until they fall into plunger wells 58 contained on column end joint body 4 (FIGS. 9 and 10). With plungers 38 in plunger wells 58, the joint cannot be accidently disassembled because operating ring collar 6 cannot be rotated transversely.

To disassemble the joint, the secondary lock must first be disengaged by pushing operating ring collar 6 directly away from the joint, then counter-rotating operating ring collar 6. When operating ring collar 6 is pushed back, plungers 38 are pulled from plunger wells 58 into lock plunger tracks 56 (FIGS. 9 and 10). As operating ring collar 6 is counter-rotated, plungers 38 are gently moved up and out of the column end joint body 4 by the ramp shape of lock plunger tracks 56. Operating ring collar 6 will not be accidently counter-rotated because reaction ring springs 12 push operating ring collar 6 as close to the joint as possible where plunger wells 58 lock it into position unless it is deliberately held back. As the secondary lock is being disengaged, the counter rotation of the operating ring collar 6 also causes the preload Belleville washer stack 32 to unload and internal latch mechanism 18 to move away from the node joint body 2 so that there is no force holding the two joint bodies together. The two halves may then be transversely disengaged.

It should become obvious to those skilled in the art that this invention is not limited to the preferred embodiments shown and described.

What is claimed as new and desired to be secured by Letters Patent of the United States is:

1. A mechanical end joint system for connecting structural column elements and providing a primary lock eliminating the possibility of free movement between joint halves during loading or vibration, comprising:
    a node joint body having a cylindrical engaging end;
    a column end joint body having a cylindrical engaging end;
    the cylindrical engaging ends of said node joint body and said column end joint body each having an integral semicircular tongue and an integral semicircular groove;
    said node joint body having a conical aperture at the center of cylindrical engaging end thereof;
    said column end joint body having an internal latch mechanism housed therein;
    said internal latch mechanism having a latch bolt element slidably disposed along the longitudinal axis of said column end joint body at the cylindrical engaging end thereof;
    said internal latch mechanism having a spring mechanism disposed along the longitudinal axis of said column end joint body;
    said internal latch mechanism having a compressible preload mechanism and plunger means housed therein;
    whereby assembly of a joint is accomplished by a transverse force on the column end joint body wherein said slidably disposed latch bolt element is pushed away from said node joint body until the longitudinal axes of the two joint halves become colinear causing:
    said spring mechanism to push said slidably disposed latch bolt element against the conical aperture of said node joint body;
    said integral semicircular tongue of said column end joint body to mate with said integral semicircular groove of said node joint body;
    said integral semicircular groove of said column end joint body to mate with said integral semicircular tongue of said node joint body; and
    locking of the mechanical end joint system and adding of a preload across the semicircular tongue and semicircular groove faces is accomplished by compressing said preload mechanism, thereby exerting an equal and opposite force on said latch bolt element and said plunger means and causing said node joint body and said column end joint body to be pressed tightly against each other, effecting a preloaded compressive fit between the two joint halves.

2. A mechanical end joint system as in claim 1 further comprising a force transfer means connected to said plunger means for transferring equal and opposite force to said column end joint body half.

3. A mechanical end joint system as in claim 2, wherein said force transfer means comprises a latch pin extending from said plunger means through said column end joint body.

4. A mechanical end joint system as in claim 1, wherein said compressible preload mechanism comprises Belleville washers.

5. A mechanical end joint system as in claim 1, wherein the column end joint body contains a secondary lock operating in a fashion normal to the operating direction of the primary lock, preventing the end joint halves from being inadvertently disassembled.

6. A mechanical end joint system as in claim 5, wherein the secondary lock comprises:
    a spring mechanism housed in a casing means around said column end joint body;
    an aperture on the surface of said column end joint body adapted to receive said spring mechanism;
    whereby assembly of said secondary lock is accomplished by the spring mechanism falling into said aperture when said primary locking of said mechanical end joint system is effected.

* * * * *